United States Patent [19]

Morris et al.

[11] Patent Number: 5,025,478
[45] Date of Patent: Jun. 18, 1991

[54] METHOD AND APPARATUS FOR DETECTING FALSE EDGES IN AN IMAGE

[75] Inventors: Octavius J. Morris, Redhill; David Moran, Crawley, both of England

[73] Assignee: U.S. Philips Corp., New York, N.Y.

[21] Appl. No.: 496,375

[22] Filed: Mar. 19, 1990

[30] Foreign Application Priority Data

Mar. 22, 1989 [GB] United Kingdom ............... 8906587

[51] Int. Cl.$^5$ ............................................. G06K 9/46
[52] U.S. Cl. ............................................... 382/22
[58] Field of Search ..................................... 382/22

[56] References Cited

U.S. PATENT DOCUMENTS 4,553,165 11/1985 Bayer ................................. 358/167
4,644,583 2/1987 Watanabe et al. ................. 382/22

OTHER PUBLICATIONS

O. J. Morris et al., "Graph Theory for Image Analysis: an Approach Based on the Shortest Spanning Tree", IEE Proceedings, vol. 133, Pt. F., No. 2, Apr. 1986.

Primary Examiner—Leo H. Boudreau
Assistant Examiner—David Fox
Attorney, Agent, or Firm—Jack D. Slobod

[57] ABSTRACT

A method of and apparatus for processing a picture signal for transmission in which the picture signal (Y) is applied to a segmentation device (2) where it is subjected to a segmentation algorithm to identify regions of similar intensity. The resulting region signal is applied to a modal filter (9) in which region edges are straightened and then to an adaptive contour smoothing circuit (10) in which contour sections identified as representing false edges are filtered. The filtered signal is subtracted from the original luminance signal in a subtractor (12) to produce a luminance texture signal which is encoded by a texture encoder (17). The region signal is encoded in a region encoder (24) together with flags indicating which of the contours in the region signal represent false edges.

8 Claims, 2 Drawing Sheets

METHOD AND APPARATUS FOR DETECTING FALSE EDGES IN AN IMAGE

BACKGROUND OF THE INVENTION

1. Field of the Invention

The present invention relates to a method of and apparatus of processing a picture signal for conveyance by means of a transmission path or storage medium, in which a picture signal is subjected to a segmentation algorithm to produce a region signal which identifies edges and closed regions in the picture, and a texture signal is produced which corresponds to the difference between the picture signal and the region signal.

1. Description of the Prior Art

Such a method of decomposing a picture signal into two components using features identified in the original picture is well known. The two components then can be coded separately. The reasoning behind this approach is that by finding and encoding perceptually important features of the picture they will be preserved and that by the separation of the picture signal into two components of very different character it is possible to design efficient codes for each of them. Image bandwidth compression aims to reduce the amount of information that must be transmitted while simultaneously preserving the quality of the decoded picture.

One problem experienced with the above method is the production of false contours or edges in the region signal in cases where there are gradual changes in the grey level of the picture signal. Here the areas concerned may be separated in the region signal into two or more regions. On reproduction when the decoded region and texture signals are added a disturbance is produced on the display which is seen as a false contour or edge. M. Kocher and R. Leornardi in their paper "Adaptive region growing technique using polynomial functions for image approximation", Signal Processing 11 (1986), pages 47 to 60, Elsevier Science Publishers B.V., propose a method of detecting and overcoming this problem. Basically Kocher and Leornadi propose the generation of a binary control image of the contours in addition to the segmented region signal. This control image is examined for boundary points and a 5×5 point (pixel) window centred on each boundary point is examined to establish whether the boundary point is on a true or false contour. If a false contour is established postfiltering is performed within a certain area around the false contour point. The production of an additional contour image signal over and above the region and texture signals for coded transmission increases the amount of processing required at the encoding (transmission) end.

SUMMARY OF THE INVENTION

It is an object of the present invention to provide a method and apparatus for processing a picture signal in which false contour or edge detection may be done in an alternative manner.

The invention provides a method of processing a picture signal for conveyance by means of a transmission path or storage medium, said method comprising the steps of:

i) producing a picture signal which corresponds to a picture.

ii) subjecting said picture signal to a segmentation algorithm to produce a region signal which identifies edges and closed regions in said picture, iii) producing a texture signal which corresponds to the difference between said picture signal and said region signal, characterised in that said method comprises the further steps of:

iv) selecting, at least a portion of a boundary between two adjacent regions in said region signal, v) determining the mean values of the region signal in small areas immediately adjacent to and on either side of said boundary portion and forming the difference between these mean values, vi) determining the mean values of the picture signal in corresponding small areas immediately adjacent to and on either side of the boundary portion identified in said region signal and forming the difference between these means values, vii) comparing the said difference obtained in step (v) with that obtained in step (vi), and viii) using the result of the comparison performed in step (vii) to determine whether the said boundary represents a true or false edge.

The above method has the advantage that in detecting false edges it does not require the generation of a further image signal.

The above method may be further characterised in that the said comparison performed in step (vii) may be between a scaled version of the difference obtained in step (v) with the difference obtained in step (vi), the scaling factor being chosen so that if the scaled difference obtained in step (v) approximates the difference obtained in step (vi) the said boundary represents a true edge but if the said scaled difference is greater than the difference obtained in step (vi) the said boundary represents a false edge.

The method may be additionally characterised in that the magnitude of the difference derived in step (v) may be determined and the comparison of step (vii) is only performed if this magnitude is below a given value.

The invention additionally provides apparatus for processing a picture signal for conveyance by means of a transmission path or storage medium, said apparatus comprising means for producing a picture signal which corresponds to a picture, means for subjecting said picture signal to a segmentation algorithm to produce a region signal which identifies edges and closed regions in said picture, means for producing a texture signal which corresponds to the difference between said picture signal and said region signal, characterised in that said apparatus further comprises further means for selecting at least a portion of a boundary between two adjacent regions in said region signal, means for determining the mean values of the region signal in small areas immediately adjacent to and on either side of said boundary portion and forming the difference between these mean values, means for determining the mean values of the picture signal in corresponding small areas immediately adjacent to and on either side of the boundary portion identified in said region signal and forming the difference between these mean values, means for comparing the said difference obtained in said region signal with that obtained in said picture signal, and means for using the result of the said comparison to determine whether the said boundary represents a true or false edge.

Such apparatus may further comprise means for obtaining a scaled version of the difference obtained in said region signal, the scaling factor being chosen so that if the scaled difference obtained approximates the difference obtained in the picture signal the said boundary represents a true edge but if the said scaled difference is greater than the difference obtained in the picture signal the said boundary represents a false edge.

The above apparatus may additionally comprise means for determining the magnitude of the difference in said region signal and for preventing the comparing of the said differences being performed if the said magnitude is above a given value.

BRIEF DESCRIPTION OF THE DRAWING

The above and other features of the invention will now be described, by way of example, with reference to the accompanying drawings, in which.

DETAILED DESCRIPTION OF THE PREFERRED EMBODIMENTS

Figure 1:
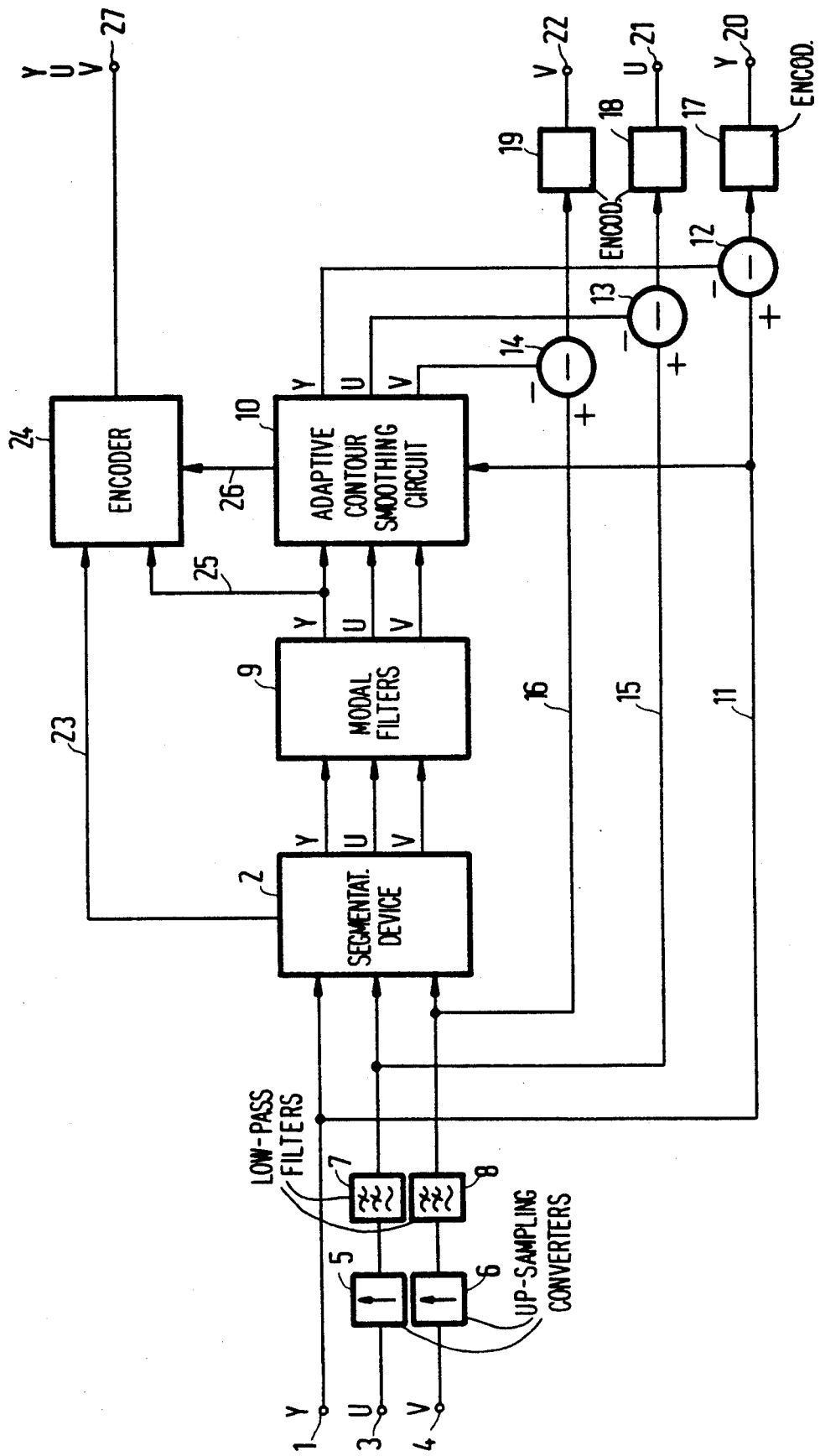
FIG. 1 is a block diagram of signal generation apparatus for use with the present invention.

In the block diagram of FIG. 1 the reference 1 indicates a terminal for receiving a digitised luminance signal Y which is applied to a first input of a segmentation device 2 in which the luminance signal is subjected to a segmentation algorithm which establishes regions of similar intensity in the image represented by the luminance signal Y and the contours surrounding the regions. Second and third terminals 3 and 4 respectively receive digitised U and V chrominance signals which are up-sampled in respective up-sampling converters 5 and 6 and the resulting up-sampled chrominance signals are applied via respective low pass filters 7 and 8 to second and third inputs of the segmentation device 2. In the embodiment as presently described the up-sampled chrominance signals are not subjected to the segmentation algorithm but instead have the results of segmentation of the luminance signal Y applied to them.

The segmented luminance and up-sampled chrominance signals are applied to respective modal filters 9 in which edges are straightened by replacing isolated pixels along the region boundaries. In the luminance signal sections of boundaries or contours are traced. First the segmented signal is scanned to find starting or "initial" points of the contours. The boundaries are traced in the manner described by R. C. Gonzalez and P. Wintz in "Digital image processing", published by Addison-Wesley, 1977, pages 253 to 265, by using the left-, and the right-most-looking rules to trace the contour, the edge of the picture or by joining up with itself. At each step the values of the two pixels on either side of the contour are stored to allow statistics to be calculated later. The tracings of each part of section of the contours is terminated in several ways:

i) the initial point is reached (i.e. a closed loop has been found).

ii) a junction with another contour has been detected.

iii) a contour has been traced previously.

The contours are traced in sections so that only the boundary between two regions is analysed and operated upon, at any one time. The mean value of the pixels of the region on one side of the contour are the same while the mean value of the pixels of an adjacent area on the other side of the contour are the same (though of course different to that within the adjacent region). The respective luminance and chrominance signal information are applied to an adaptive contour smoothing circuit 10 which also receives the original luminance signal Y from input 1 over a connection 11. The circuit 10 performs a number of functions on the luminance signal. First of all, in the segmented luminance signal, the difference is determined between the mean values present on either side of identified contour sections. Secondly the contour sections identified in the segmented luminance signal are applied to the original luminance signal and the mean value of the pixels within a corresponding region is found as is the mean value of the pixels in the corresponding area adjacent to the position of the contour section, the difference between these two mean values then being established. A scaled version of the latter difference is then compared with the difference established in the segmented luminance signal for each contour section identified. If (by suitable choice of the scaling factor) the two differences are approximately the same then the contour section represents a true edge. However if the difference found for the segmented signal is greater than the difference found for the original signal then the contour section represents a false edge. This comparison is repeated for each contour section identified in the segmented signal except for short contours as the results obtained could be unreliable. In addition the circuit 10 may initially examine the magnitude of the difference derived from the segmented luminance signal prior to the comparison being made and only allow the comparison between the differences to be made if this magnitude is below a given level; if it is above a given level it is assumed that the edge is true. The test performed is shown in the equation below. False edge is present if:

$$(\mu_{org} < a\mu_{seg}) \text{ AND } (\mu_{seg} \leq \beta)$$

Where, $$\mu_{org} = \frac{1}{N} \sum_{i=1}^{N} (P_{org}(C_{Li}) - P_{org}(C_{Ri}))$$

$$\mu_{seg} = \frac{1}{N} \sum_{i=1}^{N} (P_{seg}(C_{Li}) - P_{seg}(C_{Ri}))$$

N = Number of points along a contour
$P_{org}$ = Original picture
$P_{seg}$ = Segmented picture
$C_{Li}$ = Point on the left of the contour
$C_{Ri}$ = Point on the right of the contour
a = Scaling factor
$\beta$ = Limiting factor.

The false edges so identified are smoothed in the segmented luminance and chrominance signals to prevent artifacts on reconstruction by removal of the high frequency components by means of low pass filtering; other techniques may however be used. The smoothing can be accomplished by using simple 3-point horizontal or vertical or a 3×3 block filter, which is selected depending upon the shape of the contour edge and its orientation, and applied to pixels on either side of the boundaries.

The segmented luminance with true edges and smoothed false edges is applied to the (−) input of a first subtractor circuit 12 whose (+) input receives the original luminance signal from connection 11, the output of circuit 12 being the luminance texture signal. In a similar manner the segmented U and V chrominance signals filtered as appropriate, are applied to the (−) input of respective second (13) and third (14) subtractor circuits whose (+) input respectively receive the original U chrominance signal and original V chrominance signal over connections 15 and 16, the output of the circuit 13 and 14 respectively providing the U chrominance texture signal and the V chrominance signal. These texture signals are each encoded in respective encoder units 17, 18 and 19 whose outputs are connected to respective output terminals 20, 21 and 22 so that terminal 20 provides the encoded luminance texture signal, terminal 21 provides the encoded U chrominance texture signal and terminal 22 provides the encoded V chrominance texture signal. The encoded texture signals from terminals 20, 21 and 22 are applied to a transmission path or a storage medium with or without further processing, as necessary.

A signal representing the intensities of regions in the segmented luminance signal is derived from the segmentation device 2 and applied over a connection 23 to a further encoder unit 24. This unit also receives the coordinates for the contour sections in the segmented luminance signal, found in the modal filter 9, over a connection 25 and flag signals indicating which of these represents false edges in the adaptive contour smoothing circuit 10, and have thus been smoothed, over a connection 26. The encoder unit 24 encodes the information relating to these contours and the intensities of the regions identified by the segmentation device 2 and also encodes the flag signals from the circuit 10. The encoded region and flag information is applied to a further output terminal 27 for application to a transmission path or storage medium with or without further processing as necessary.

Figure 2:
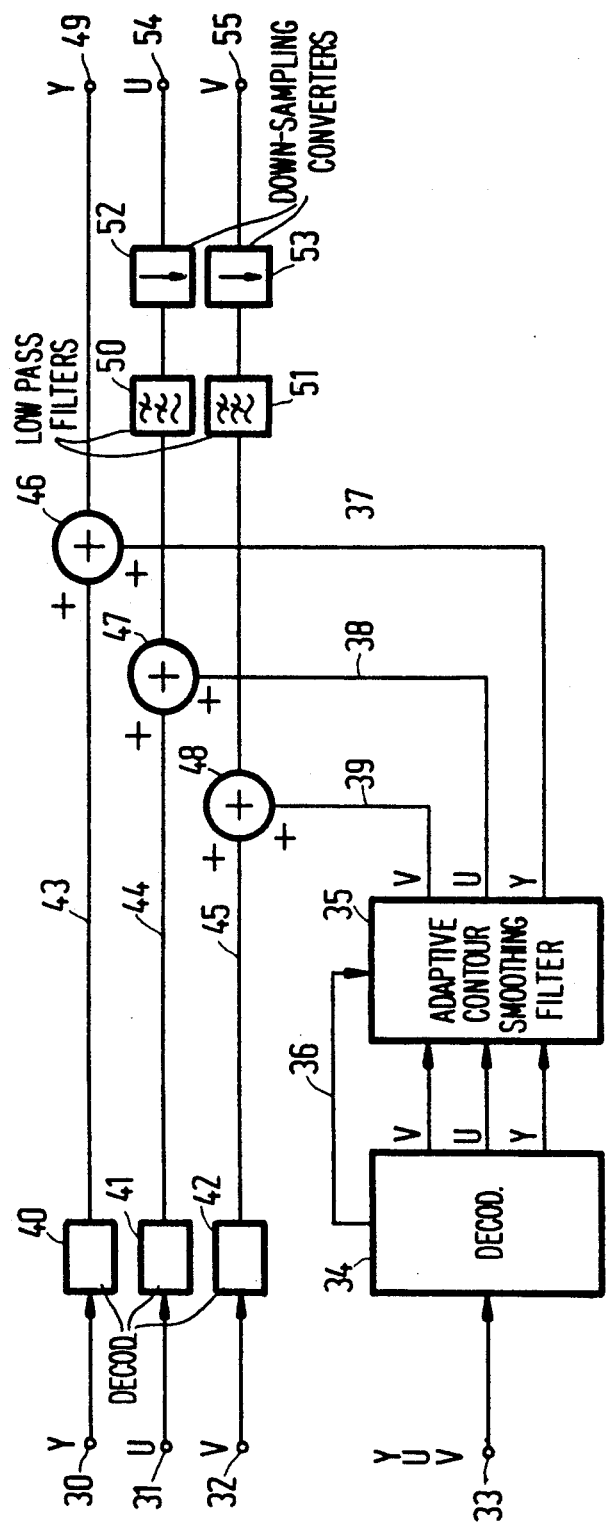
FIG. 2 is a block diagram of signal reconstruction apparatus for use with the present invention.

FIG. 2 is a block diagram of signal reconstruction apparatus in which references 30, 31 and 32 indicate input terminals for receiving the encoded luminance texture signal and the U and V chrominance texture signals which are derived with or without further processing, as necessary, from a transmission path or storage medium. A further input 33 similarly receives the encoded region and flag information from the transmission path or storage medium. This encoded region and flag information is applied to a decoder 34 to reproduce the information regarding the region contours and intensities for the luminance Y and chrominance U and V which are applied to an adaptive contour smoothing filter 35. The filter also receives the decoded flag signals via a connection 36 from the decoder 34 which flag signals indicate when a contour section represents a false edge. When such false edges are present the region signals are smoothed (by means of a low pass filter) and the resulting luminance Y and chrominance U and V region signals applied to connections 37, 38 and 39 respectively.

The luminance Y and chrominance U and V encoded texture signals present on input terminals 30, 31 and 32 are applied to respective decoders 40, 41 and 42 to produce decoded luminance Y and chrominance U and V texture signals on connections 43, 44 and 45. These are applied to the first input of respective adder circuits 46, 47 and 48 the second inputs of which receive the appropriate region signals from connections 37, 38 and 39. The reconstructed luminance signal Y from the output of adder 48 is applied to an output terminal 49. The reconstructed U and V chrominance signals respectively produced by adder circuits 47 and 48 are still in up-sampled form and are therefore applied via an associated low pass filter 50,51 to an associated down-sampling converter 52,53 to produce a reconstructed U chrominance signal at an output terminal 54 and a reconstructed V chrominance signal at an output terminal 55 for display purposes.

In the above description of FIG. 1 the up-sampled U and V chrominance signals are not themselves subjected to segmentation but use the results of the application of the segmentation algorithm to the luminance signal to define regions in these chrominance signals. However the chrominance signals could be processed in the same manner as the luminance signal by application of the segmentation algorithm though this will add slightly to the complexity of the generating apparatus.

From reading the present disclosure, other modifications will be apparent to persons skilled in the art. Such modifications may involve other features which are already known in the design, manufacture and use of apparatus for processing picture signals and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

We claim:

1. A method of processing a picture signal for conveyance by means of a transmission path or storage medium, said method comprising the steps of:
  i) producing a picture signal which corresponds to a picture,
  ii) subjecting said picture signal to a segmentation algorithm to produce a region signal which identifies edges and closed regions in said picture,
  iii) producing a texture signal which corresponds to the difference between said picture signal and said region signal, characterised in that said method comprises the further steps of
  iv) selecting, at least a portion of a boundary between two adjacent regions in said region signal,
  v) determining the mean values of the region signal in areas immediately adjacent to and on either side of said boundary portion and forming the difference between these mean values,
  vi) determining the mean values of the picture signal in corresponding areas immediately adjacent to and on either side of the boundary portion identified in said region signal and forming the difference between these means values,
  vii) comparing the said difference obtained in step (v) with that obtained in step (vi), and
  viii) using the result of the comparison performed in step
  (vii) to determine whether the said boundary represents a true or false edge.

2. A method as claimed in claim 1, characterised in that the said comparison performed in step (vii) is between a scaled version of the difference obtained in step (v) with the difference obtained in step (vi), the scaling factor being chosen so that if the scaled difference obtained in step (v) approximates the difference obtained in step (vi) the said boundary represents a true edge but if the said scaled difference is greater than the difference obtained in step (vi) the said boundary represents a false edge.

3. A method as claimed in claim 1, characterised in that the magnitude of the difference derived in step (v) is determined and the comparison of step (vii) is only performed if this magnitude is below a given value.

4. Apparatus for processing a picture signal for conveyance by means of a transmission path or storage medium, said apparatus comprising means for producing a picture signal which corresponds to a picture, means for subjecting said picture signal to a segmentation algorithm to produce a region signal which identifies edges and closed regions in said picture, means for producing a texture signal which corresponds to the difference between said picture signal and said region signal, characterised in that said apparatus further comprises further means for selecting at least a portion of a boundary between two adjacent regions in said region signal, means for determining the mean values of the region signal in areas immediately adjacent to and on either side of said boundary portion and forming the difference between these mean values, means for determining the mean values of the picture signal in corresponding areas immediately adjacent to and on either side of the boundary portion identified in said region signal and forming the difference between these mean values, means for comparing the said difference obtained in said region signal with that obtained in said picture signal, and means for using the result of the said comparison to determine whether the said boundary represents a true or false edge.

5. Apparatus as claimed in claim 4, characterised in that it further comprises means for obtaining a scaled version of the difference obtained in said region signal, the scaling factor being chosen so that if the scaled difference obtained approximates the difference obtained in the picture signal the said boundary represents a true edge but if the said scaled difference is greater than the difference obtained in the picture signal the said boundary represents a false edge.

6. Apparatus as claimed in claim 4, characterised in that said apparatus further comprises means for determining the magnitude of the difference in said region signal and for preventing the comparing of the said differences being performed if the said magnitude is above a given value.

7. A method as claimed in claim 2, characterized in that the magnitude of the difference derived in step (v) is determined and the comparison of step (vii) is only performed if this magnitude is below a given value.

8. Apparatus as claimed in claim 5, characterised in that said apparatus further comprises means for determining the magnitude of the difference in said region signal and for preventing the comparing of the said differences being performed in the said magnitude is above a given value.

* * * * *